(12) United States Patent
Russo

(10) Patent No.: US 6,244,759 B1
(45) Date of Patent: Jun. 12, 2001

(54) ADJUSTABLE CAMERA SUPPORT

(76) Inventor: Rob Russo, 14 Broad St., Suite 20, Norwood, NJ (US) 07648

(*) Notice: Subject to any disclaimer, the term of this patent is extended or adjusted under 35 U.S.C. 154(b) by 0 days.

(21) Appl. No.: 09/307,481

(22) Filed: May 10, 1999

(51) Int. Cl.$^7$ .................................................. G03B 17/00
(52) U.S. Cl. ........................... 396/428; 396/419; 352/243
(58) Field of Search .................................... 396/419, 428; 352/243; D16/242, 244; 362/190, 191

(56) References Cited

U.S. PATENT DOCUMENTS

| | | | | |
|---|---|---|---|---|
| D. 345,573 | * | 3/1994 | Reppert | D16/243 |
| D. 382,286 | * | 8/1997 | Doran | D16/242 |
| D. 411,220 | * | 6/1999 | Surabian | 396/428 X |
| 4,534,632 | * | 8/1985 | Laviolette | 396/419 |
| 4,640,481 | * | 2/1987 | Kohno | 396/419 |
| 4,963,903 | * | 10/1990 | Cane | 396/428 |
| 4,963,904 | * | 10/1990 | Lee | 396/423 |
| 5,022,137 | * | 6/1991 | Sorensen et al. | 29/559 |
| 5,103,384 | * | 4/1992 | Drohan | 362/191 |
| 5,163,752 | * | 11/1992 | Copeland et al. | 362/396 |
| 5,260,731 | * | 11/1993 | Baker | 396/428 |
| 5,305,034 | * | 4/1994 | Aratani | 396/420 |
| 5,513,784 | * | 5/1996 | Pretorius | 248/168 |
| 5,702,175 | * | 12/1997 | Chen | 362/191 |

\* cited by examiner

*Primary Examiner*—Alan A. Mathews
(74) *Attorney, Agent, or Firm*—Richard A. Joel, ESQ

(57) ABSTRACT

An adjustable camera support comprises a lower pistol grip clamp for rapidly securing the support to an object, a flexible intermediate gooseneck portion for adjusting the camera as determined and an upper platform support for mounting the camera. The platform support includes adjusting mechanisms for moving the camera vertically through 180° and horizontally through 360°. A wide range of adjustments for camera sightings is achieved expeditiously by the gooseneck portion and the platform adjustment.

3 Claims, 1 Drawing Sheet

ADJUSTABLE CAMERA SUPPORT

CROSS-REFERENCE TO RELATED APPLICATIONS

NONE

STATEMENT REGARDING FEDERALLY SPONSORED RESEARCH OR DEVELOPMENT

NOT APPLICABLE

BACKGROUND OF THE INVENTION

Field of the Invention

This invention relates to camera tripods and particularly to camera supports which can be readily mounted to a variety of surfaces and can adjust vertically and pivot horizontally through 360° as well as various angles.

DESCRIPTION OF THE RELATED ART INCLUDING INFORMATION DISCLOSED UNDER 37 CFR §§1.97–1.98

The prior art includes U.S. Pat. No. 3,833,196 to Protzman which discloses a camera support which is designed to be attached to an automobile window by a pair of clips. The support is movable about two mutually perpendicular axis.

U.S. Pat. No. 4,640,481 to KOHNO discloses a camera holder which comprises a first pipe, a second pipe telescopically connected to the first pipe, and a clamp connected to the second pipe. U.S. Pat. No. 4,943,820 to LAROCK discloses a portable camera support comprising a shoulder support which extends outwardly from the user's shoulder and supports a camera. A telescoping extension tube extends forwardly from the front end of the shoulder support and is pivotably attached to a torso engaging support member.

U.S. Pat. No. 4,963,904 to LEE discloses a camera support assembly with an adjustment block, hand grip and mount adjustment knob which allows the user to position the camera in a wide range of orientations.

Design patent 345,573 to REPPERT appears to disclose a coiled shoulder support for a video camera while U.S. Pat. No. 5,260,731 to BAKER, JR. discloses a camera mount for a vehicle which includes a mounting bracket and L-shaped nesting grips. The camera may be rotated through a full 360° for filming without being limited by the mounting structure.

Other patents of interest are U.S. Pat. Nos. 4,534,632; 5,305,034; 5,513,784; and, D382,286.

SUMMARY OF THE INVENTION

This invention relates to camera support or tripods and particularly to supports which can be readily mounted to a wide variety of surfaces and which may be rotated and adjusted to provide the desired photographs.

The camera support comprises a lower portion which includes a pistol grip clamp which may be used to mount the support to almost any surface. An intermediate portion comprises tubular portion on which the upper jaw of the clamp slides for adjustment purposes while the lower jaw is fixedly mounted thereto. The intermediate portion extends upwardly from the clamp and a flexible gooseneck, which permits a wide range of adjustment is mounted to the other end of the intermediate portion. The gooseneck may be readily removed if a more compact device is desired. A camera support which is adjustable in two planes is mounted to the other end of the gooseneck.

A camera may be mounted to the support with a quick connect coupling or other connection. The invention is particularly useful in mounting video cameras.

Accordingly, an object of this invention is to provide a new and improved camera support.

Another object of this invention is to provide a new and improved camera support which may be readily clamped to a wide variety of surfaces.

A further object of this invention is to provide a new and improved camera support which can be readily clamped to surfaces with a pistol grip clamp and includes a flexible upper portion for adjusting the camera in a plurality of directions.

A still further object of this invention is to provide a new and improved camera support which includes a versatile clamp for rapidly mounting the support thereto, a flexible intermedia portion for adjustment purposes and a rotatable support platform.

A more specific object of this invention is to provide a new and improved camera support which includes a pistol grip clamp at its lower end to attach to a variety of surfaces, a flexible gooseneck portion affixed thereto and a rotatable support platform which may be adjusted in two planes and to which a camera may be detachably mounted.

BRIEF DESCRIPTION OF THE DRAWINGS

The above and other objects and advantages of this invention may be more clearly seen when viewed in conjunction with the accompanying drawings wherein.

DETAILED DESCRIPTION OF THE INVENTION

Figure 1:
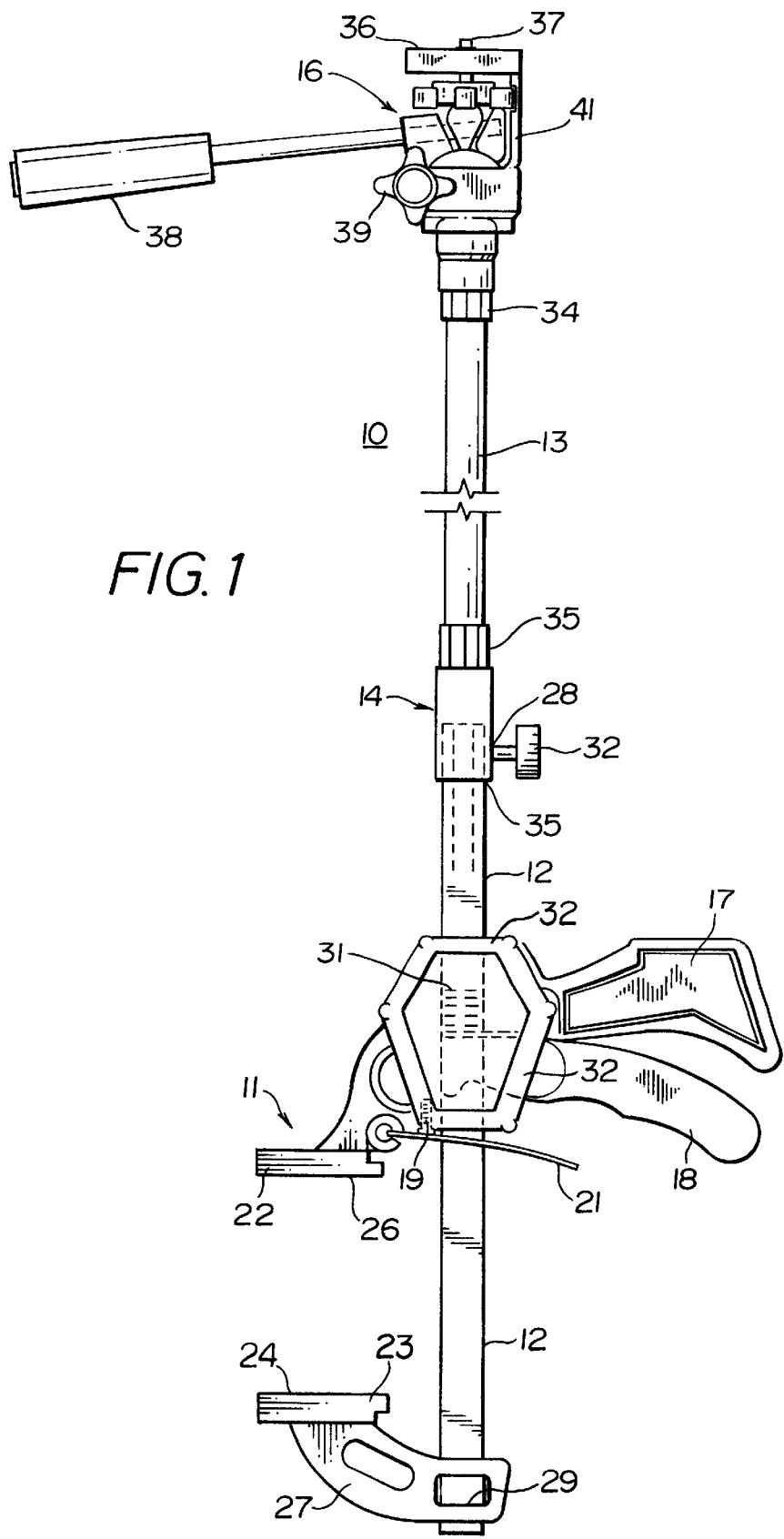
FIG. 1 is a side view of the invention, parts of which are shown in phantom.

Referring now to the drawings, the invention as shown in FIG. 1 relates to camera supports and particularly to an extremely versatile support which may be clamped to a wide variety of surfaces and adjusted in a plurality of directions.

FIG. 1 discloses the invention in a side view. The camera support comprises a pistol grip clamp 11 at its lower end, a tubular portion 12 extending upwardly therefrom, a flexible gooseneck 13 mounted to the upper end of the tubular portion 12 with a clamp 14 and an adjustable camera support platform 16 mounted to the other end of the gooseneck 13.

The clamp 11 may be rapidly attached to a wide variety of surfaces by merely grasping the handle 17 and squeezing the trigger or pivotal pump action grip 18. A tension spring 19 engages the tension release lever 21 forcing the jaw 22 downwardly along post or tubular portion 12 to clamp a support (not shown) between said adjustable jaw 22 and a stationary jaw 23. The jaw 23, which lacks a locking mechanism, includes a flat clamping surface 24 which is positioned opposite a similar surface 26 on the upper jaw 22. Jaw 23 includes a downwardly extending body portion 27 which is mounted about the tubular member 12 at its end 29 and is moveable therealong.

The tubular member 12, which may also be an extruded aluminum bar extends upwardly through the internal clamp mechanism 31, grip 17 and bracket 32. At its upper end, the tubular or bar member 12 is inserted into an aperture 33 in the clamp 14. The clamp 14 includes a side aperture 28 through which a thumb screw 34 or quick release mechanism (not shown) extends to engage and lock the flexible gooseneck 13 to the member 12. Alternatively, the support 16 which is adjustable in two planes, may be mounted directly to the tubular portion 12 if a more compact design is required.

The tubular gooseneck 13 which is approximately 1.5 cm in diameter provides a flexible adjustment for the camera support 16 at its upper end. A typical gooseneck 13 is about 12 cm between couplings 34. The support 16 includes an upper platform 36 with a camera mounting screw 37 projecting upwardly therefrom. In lieu of the screw 37, a conventional quick connect arrangement may be used to mount the camera on the platform 36. A lever 38 projects outwardly therefrom to provide a vertical adjustment for the platform 36 while a tension knob 39 provides a horizontal adjustment. The platform 36 is mounted to upwardly projecting member 41 which permits rotation vertically through 180° as well as through 360° horizontally.

In an alternate low cost embodiment, a plastic disposable camera could be mounted to the gooseneck with a goose neck clamp and the platform 16 eliminated. Also, in lieu of a camera, a flashlight may be mounted to a conventional hose clamp which is attached to either the coupling 34 or, in the absence of a gooseneck 13, to the coupling 14. This permits a full range of adjustment for lighting purposes.

In operation, the pistol grip 18 and tension release lever 21 may be activated to clamp the jaws 22 and 23 to any object which fits therebetween. To facilitate clamping, the jaw surfaces 24 and 26 may be rubber padded to aid in gripping. The gooseneck 13 may be bent in a desired direction to aim the camera which is mounted to platform 36. The final camera adjustment may be made by using the lever 38 and knob 39 to move the platform 16 in two planes. Thus an extremely simple, easy to use adjustment may be made for taking photographs.

While the invention has been explained by a detailed description of certain specific embodiments, it is understood that various modifications and substitutions can be made in any of them within the scope of the appended claims which are intended also to include equivalents of such embodiments.

What is claimed is:

1. An adjustable camera support comprises:
   a lower pistol grip clamping portion for securing the support having an upwardly extending tubular portion wherein the lower pistol grip portion comprises a lower stationary jaw and an moveable upper jaw, a pump action clamp tensioning means coupled to the upper jaw, and a tension release lever connected to said tensioning means wherein movement of the lever causes the upper jaw to move opposite the lower jaw for clamping purposes;
   a flexible intermediate gooseneck portion having one end mounted to the tubular portion for adjusting the camera;
   an upper platform support mounted to the other end of the gooseneck portion for mounting the camera; and,
   means mounted to the platform support to permit adjusting the platform support vertically and horizontally wherein the adjusting means for the camera support comprises a lever extending outwardly coupled to the platform support to adjust the platform vertically through 180° and a tension knob coupled to the platform support for adjusting the support horizontally through 360°.

2. An adjustable camera support comprises:
   a lower pistol grip clamping portion for securing the support having an upwardly extending tubular portion wherein the lower pistol grip portion comprises a lower stationary jaw and an moveable upper jaw, a pump action clamp tensioning means coupled to the upper jaw, and a tension release lever connected to said tensioning means wherein movement of the lever causes the upper jaw to move opposite the lower jaw for clamping purposes;
   a flexible intermediate gooseneck portion having one end mounted to the tubular portion for adjusting the camera; and
   an upper platform support mounted to the other end of the gooseneck portion for mounting the camera said support comprising a flat surface having a quick connect coupling extending upwardly therefrom.

3. An adjustable camera support comprises:
   a lower pistol grip clamping portion for securing the support having an upwardly extending tubular portion and wherein the lower pistol grip comprises a lower stationary jaw and an moveable upper jaw, a pump action clamp tensioning means coupled to the lower jaw, and a tension release lever connected to said means wherein movement of the lever causes the upper jaw to move opposite the lower jaw for clamping purposes, and further including an elongated metal element extending upwardly from the lower pistol grip portion
   a flexible intermediate gooseneck portion having one end mounted to the tubular portion for adjusting the camera;
   an upper platform support mounted to the other end of the gooseneck portion for mounting the camera;
   means mounted to the platform support to permit adjusting the platform support vertically and horizontally; and,
   a coupling joining said metal element of the pistol grip portion to the gooseneck portion, said coupling comprising a hollow element which engages the metal element, and a quick release mechanism to adjustably fix the metal element within the hollow element.

* * * * *